(12) United States Patent
Walker, Jr.

(10) Patent No.: US 9,054,502 B1
(45) Date of Patent: Jun. 9, 2015

(54) CERAMIC FOR IGNITION DEVICE INSULATOR WITH LOW RELATIVE PERMITTIVITY

(71) Applicant: Federal-Mogul Ignition Company, Southfield, MI (US)

(72) Inventor: William J. Walker, Jr., Ann Arbor, MI (US)

(73) Assignee: Federal-Mogul Ignition Company, Southfield, MI (US)

( * ) Notice: Subject to any disclaimer, the term of this patent is extended or adjusted under 35 U.S.C. 154(b) by 0 days.

(21) Appl. No.: 14/452,802

(22) Filed: Aug. 6, 2014

(51) Int. Cl.
*C04B 35/195* (2006.01)
*H01T 13/20* (2006.01)
*H01T 13/38* (2006.01)

(52) U.S. Cl.
CPC ............... *H01T 13/20* (2013.01); *H01T 13/38* (2013.01)

(58) Field of Classification Search
USPC ................ 313/118–145; 129/169 R, 169 EL
See application file for complete search history.

(56) References Cited

U.S. PATENT DOCUMENTS

| | | | | |
|---|---|---|---|---|
| 6,004,501 | A * | 12/1999 | Cornelius et al. | 264/631 |
| 7,037,870 | B2 * | 5/2006 | Yamamoto et al. | 501/120 |
| 7,169,723 | B2 | 1/2007 | Walker, Jr. | |
| 7,799,717 | B2 | 9/2010 | Walker, Jr. | |
| 7,858,547 | B2 | 12/2010 | Walker, Jr. et al. | |
| 2012/0187819 | A1 * | 7/2012 | Takaoka et al. | 313/118 |
| 2012/0306345 | A1 | 12/2012 | Zheng et al. | |

* cited by examiner

*Primary Examiner* — Tracie Y Green
(74) *Attorney, Agent, or Firm* — Robert L. Stearns; Dickinson Wright, PLLC

(57) ABSTRACT

A ceramic insulator for surrounding an electrode of an ignition device, such as a corona igniter or spark plug, is provided. The insulator is formed of a ceramic material including alumina in an amount of 28 to 38 wt. %, silica in an amount of 57 to 67 wt. %, and calcium oxide in an amount of 3 to 7 wt. %, based on the total weight of the ceramic material. The ceramic insulator is typically formed by firing a mixture of Kaolin, calcium carbonate, and silica, wherein the calcium carbonate acts as a flux during firing. The ceramic material has a relative permittivity of about 5.5 to 6.5 and thus improves the electrical efficiency of the ignition device. The ceramic material is also capable of withstanding temperatures of 900 to 1000° C. and has excellent thermal shock resistance, making it suitable for use in internal combustion engines.

20 Claims, 1 Drawing Sheet

CERAMIC FOR IGNITION DEVICE INSULATOR WITH LOW RELATIVE PERMITTIVITY

BACKGROUND OF THE INVENTION

1. Field of the Invention

This invention relates generally to insulators for igniters of internal combustion engines, such as insulators for corona igniters or spark plugs, and methods of forming the insulators.

2. Related Art

Ignition devices for use in internal combustion engine applications, such as corona igniters and spark plugs, include an insulator surrounding a central electrode. The insulator is typically formed of ceramic material, such as alumina, which is able to withstand high temperatures encountered in a combustion chamber of the internal combustion engine. However, the performance of the ignition device can be restricted by the ceramic insulator. For example, in corona igniters, when the insulator is formed of alumina ceramic having a relative permittivity of about 10 to 10.5, the electrical efficiency is limited due to electrical losses. These electrical losses are caused by charge stored in the alumina ceramic, which is typically at a capacitance of about 15 picofarads. The electrical efficiency of the corona igniter could be increased by about 50% if the insulator were formed of a material having a relative permittivity of about 5, such as polytetrafluoroethylene (PTFE). However, PTFE is not able to withstand the high temperatures of the internal combustion engine, and thus ceramic materials are still preferred.

SUMMARY OF THE INVENTION

One aspect of the invention provides an insulator for an ignition device, such as a corona igniter or a spark plug, providing improved electrical efficiency and capable of withstanding high temperatures in an internal combustion engine. The insulator comprises a ceramic material including alumina in an amount of 28 to 38 wt. %, silica in an amount of 57 to 67 wt. %, and calcium oxide in an amount of 3 to 7 wt. %, based on the total weight of the ceramic material.

Another aspect of the invention provides a method of manufacturing an insulator for an ignition device. The method includes firing a mixture of Kaolin and at least one of: a) calcium carbonate and silica; b) calcium silicate; and c) calcium sulfate and silica.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
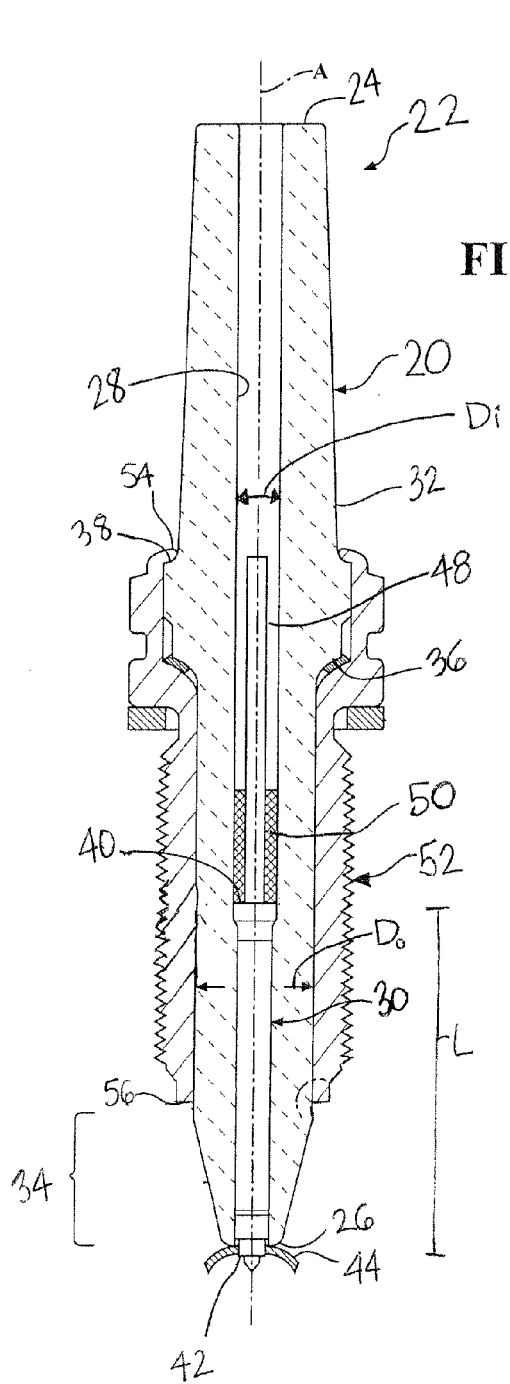
FIG. 1 is a cross-sectional view of a corona igniter including an improved insulator according to one exemplary embodiment of the invention.

Referring to the Figures, wherein like numerals indicate corresponding parts throughout the several views, an insulator 20, 120 for an ignition device 22, 122, such as a corona igniter or a spark plug, is generally shown. The insulator 20, 120 is formed of a ceramic material including a mixture of calcium aluminosilicate glass and mullite crystals, which both have a low relative permittivity. The overall relative permittivity of the ceramic material is about 5.5 to 6.5, and thus the insulator 20, 120 stores less capacitance charge and provides improved electrical efficiency, compared to alumina and other ceramic materials typically used to form insulators of ignition devices. The insulator 20, 120 is also able to withstand temperatures of 900 to 1000° C. and has excellent thermal shock resistance, making it suitable for use in internal combustion engine applications.

The ceramic material of the insulator 20, 120 includes alumina in an amount of 28 to 38 weight percent (wt. %), silica in an amount of 57 to 67 wt. %, and calcium oxide in an amount of 3 to 7 wt. %, based on the total weight of the ceramic material after firing the ceramic material. In a preferred exemplary embodiment, the alumina is present in an amount of 33 wt. %, the silica is present in an amount of 62 wt. %, and the calcium oxide is present in an amount of 5 wt. %, based on the total weight of the ceramic material after firing.

The ceramic material used to form the insulator 20, 120 can include small amounts of other components. However, the ceramic material is preferably free of crystalline silica, in order to achieve adequate mechanical strength and thermal shock resistance for use in the internal combustion engine applications. The ceramic material preferably includes crystalline silica in an amount of 0 wt. %, but could include crystalline silica in an amount up to 2 wt. %, based on the total weight of the ceramic material after firing. The ceramic material is also preferably free of alkali metals or oxides thereof, such as sodium oxide or potassium oxide, in order to prevent dielectric loss and improve electrical conductivity. Alkali metals are found in Group 1 of the Periodic Table and consist of the chemical elements lithium (Li), sodium (Na), potassium (K), rubidium (Rb), caesium (Cs), and francium (Fr). The ceramic material preferably includes the alkali metals or oxides thereof in an amount of 0 wt. %, but could include the alkali metals or oxides thereof in an amount up to 2 wt. %, based on the total weight of the ceramic material after firing.

In the exemplary embodiment, the entire insulator 20, 120 consists of, or consists essentially of, the ceramic material described above. However, alternatively, a majority of the insulator 20, 120 could consists of, or consist essentially of, the ceramic material described above, while a smaller portion of the insulator 20 is formed of another material. In yet another embodiment, the insulator 20 includes the ceramic material, but less than half of the insulator 20 consists of, or consists essentially of, the ceramic material.

Another aspect of the invention provides an ignition device 22, 122 including the improved insulator 20, 120. In the exemplary embodiment of FIG. 1, the ignition device 22 is a corona igniter. The corona igniter can comprise various different designs. However, in the exemplary corona igniter of FIG. 1, the insulator 20 extends longitudinally along a center axis A from an insulator upper end 24 to an insulator nose end 26. The insulator 20 also presents an insulator inner surface 28 surrounding a bore which extends longitudinally from the insulator upper end 24 to the insulator nose end 26 for receiving a central electrode 30. The insulator inner surface 28 presents an insulator inner diameter Di extending across and perpendicular to the center axis A. The insulator inner diameter Di typically decreases along a portion of the insulator 20 moving toward the insulator nose end 26 for supporting a portion of the central electrode 30.

The insulator 20 of this exemplary embodiment also presents an insulator outer surface 32 having an insulator outer diameter Do extending across and perpendicular to the center axis A. The insulator outer surface 32 extends longitudinally from the insulator upper end 24 to the insulator nose end 26. In the exemplary embodiment, the insulator outer diameter Do decreases along a portion of the insulator 20 adjacent the insulator nose end 26, moving toward the insulator nose end 26, to present an insulator nose region 34. The insulator outer diameter Do also decreases in a direction moving toward the insulator nose end 26 in a location spaced from the insulator nose region 34, approximately at the middle of the insulator 20, to present an insulator lower shoulder 36. The insulator outer diameter Do also decreases along a portion of the insulator 20 moving toward the insulator upper end 24 at a location spaced from the insulator lower shoulder 36 to present an insulator upper shoulder 38.

The central electrode 30 of the corona igniter is formed of an electrically conductive material and is disposed in the bore of the insulator 20. The central electrode 30 has a length L extending along the center axis A from a terminal end 40 to a firing end 42, wherein a majority of the length L of the central electrode 30 is surrounded by the insulator 20. In the exemplary embodiment, the central electrode 30 includes a firing tip 44 at the firing end 42. The firing tip 44 has a plurality of branches each extending radially outwardly from the center axis A for providing the corona discharge.

The corona igniter also typically includes a terminal 48 disposed in the bore of the insulator 20 and engaging the terminal end 40 of the central electrode 30. A seal 50 is then disposed on the terminal end 40 of the central electrode 30 and around a portion of the terminal 48 to fill a portion of the bore. A shell 52 formed of metal typically surrounds a portion of the insulator 20 and couples the insulator 20 to a cylinder block (not shown) of the internal combustion engine. The shell 52 extends along the center axis A from a shell upper end 54 to a shell lower end 56. The shell upper end 54 is disposed between the insulator upper shoulder 38 and the insulator upper end 24 and engages the insulator 20. The shell lower end 56 is disposed adjacent the insulator nose region 34 such that at least a portion of the insulator nose region 34 extends axially outwardly of the shell lower end 56.

Figure 2:
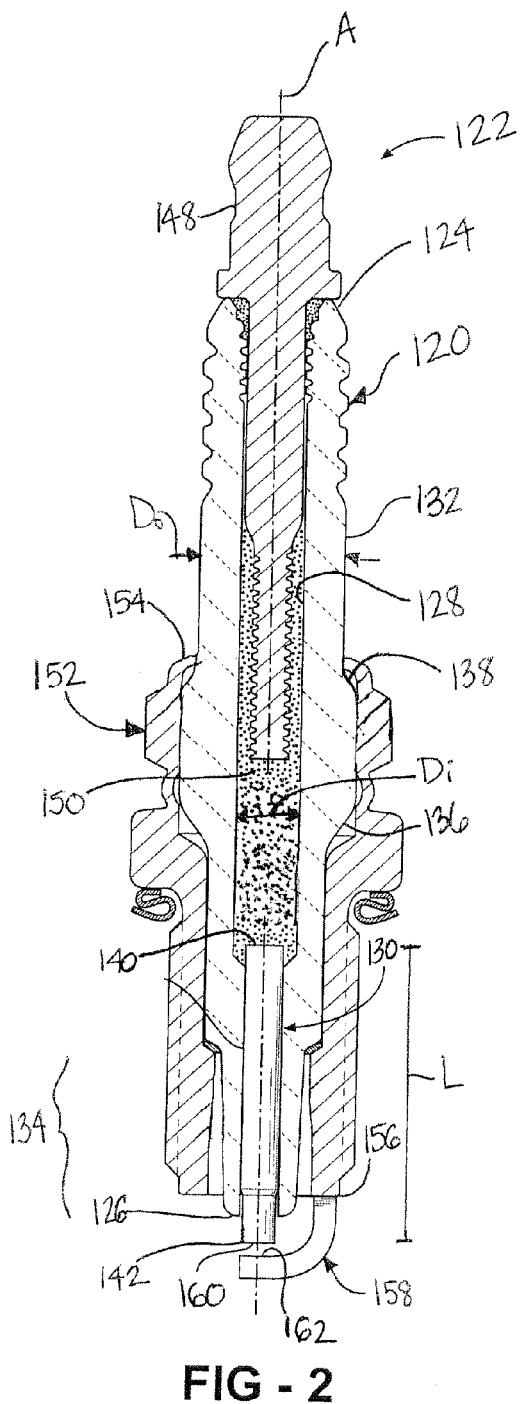
FIG. 2 is a cross-sectional view of a spark plug including the improved insulator according to another exemplary embodiment of the invention.

In another exemplary embodiment, as shown in FIG. 2, the ignition device 122 including the improved insulator 120 is a spark plug. In this exemplary embodiment, the insulator 120 also extends longitudinally along a center axis A from the insulator upper end 124 to the insulator nose end 126. The insulator 120 also presents the insulator inner surface 128 surrounding a bore extending longitudinally from the insulator upper end 124 to the insulator nose end 126 for receiving the central electrode 130. The insulator inner surface 128 presents the insulator inner diameter Di extending across and perpendicular to the center axis A and decreasing along a portion of the insulator 120 moving toward the insulator nose end 126 for supporting a portion of the central electrode 130.

The insulator 120 of this exemplary embodiment also includes the insulator outer surface 132 having the insulator outer diameter Do extending across and perpendicular to the center axis A. The insulator outer surface 132 extends longitudinally from the insulator upper end 124 to the insulator nose end 126, and the insulator outer diameter Do decreases along a portion of the insulator 120 adjacent the insulator nose end 126 and moving toward the insulator nose end 126 to present the insulator nose region 134. The insulator outer diameter Do also decreases along a portion of the insulator 120 spaced from the insulator nose region 134 and moving toward the insulator nose end 126 to present the insulator lower shoulder 136, and decreases along a portion of the insulator 120 moving toward the insulator upper end 124 at a location spaced from the insulator lower shoulder 136 to present the insulator upper shoulder 138.

The central electrode 130 of the spark plug is also formed of electrically conductive material and is disposed in the bore of the insulator 120. The central electrode 130 has a length L extending along the center axis A from the terminal end 140 to the firing end 142, and the majority of the length L is surrounded by the insulator 120. Unlike the central electrode 30 of the corona igniter, the central electrode 130 of the spark plug includes a central firing surface 160 at the firing end 142 for providing a spark. This central electrode 130 may include a firing tip (not shown) formed of a more durable electrically conductive material, compared to the material used to form the other portions of the central electrode 130.

The spark plug also typically includes the terminal 148 disposed in the bore of the insulator 120 and coupled to the terminal end 140 of the central electrode 130. The seal 150 fills a portion of the bore of the insulator 120 and couples the terminal end 140 of the central electrode 130 to the terminal 148. The metal shell 152 extends along the center axis A from the shell upper end 154 to the shell lower end 156 and surrounds a portion of the insulator 120. In this exemplary embodiment, the shell upper end 154 is disposed between the insulator upper shoulder 138 and the insulator upper end 124 and engages the insulator 120, and the shell lower end 156 is disposed adjacent the insulator nose region 134 such that at least a portion of the insulator nose region 134 extends axially outwardly of the shell lower end 156.

The spark plug also includes a ground electrode 158 formed of an electrically conductive material, as shown in FIG. 2. The ground electrode 158 extends from the shell lower end 156 toward the central electrode 130. The ground electrode 158 includes a ground firing surface 162 facing the central firing surface 160 to provide a spark gap between the firing surfaces 160, 162.

Another aspect of the invention provides a method of manufacturing the insulator 20, 120 for use in the ignition device 22, 122, such as the corona igniter or spark plug. The method includes firing a mixture of Kaolin ($Al_2Si_2O_5(OH)_4$), calcium carbonate ($CaCO_3$), silica ($SiO_2$), calcium silicate ($Ca_2SiO_4$), and/or calcium sulfate ($CaSO_4$). A portion of the Kaolin ($Al_2Si_2O_5(OH)_4$) may be substituted with calcined Kaolin ($Al_2Si_2O_7$), which is made by heating the Kaolin to a temperature of over about 700° C., thereby converting the Kaolin to meta-Kaolin by driving off the chemically bonded water. The method produces the ceramic material described above, which includes the mixture of calcium aluminosilicate glass and mullite crystals. The composition of the ceramic material includes alumina in an amount of 28 to 38 wt. %, silica in an amount of 57 to 67 wt. %, and calcium oxide in an amount of 3 to 7 wt. %, based on the total weight of the ceramic material after firing.

The method typically includes firing a mixture of Kaolin, calcium carbonate, and silica, in which case the calcium carbonate and resulting calcium oxide acts as a flux during firing. The method can alternatively include firing a mixture of Kaolin and calcium silicate; and/or a mixture of Kaolin, calcium sulfate, and silica.

Obviously, many modifications and variations of the present invention are possible in light of the above teachings and may be practiced otherwise than as specifically described while within the scope of the appended claims.

What is claimed is:
1. An insulator for an ignition device, comprising:
  a ceramic material including alumina in an amount of 28 to 38 wt. %, silica in an amount of 57 to 67 wt. %, and calcium oxide in an amount of 3 to 7 wt. %, based on the total weight of said ceramic material.

2. The insulator of claim 1, wherein said ceramic material includes a mixture of calcium aluminosilicate glass and mullite crystals.

3. The insulator of claim 1, wherein said alumina is present in an amount of 33 wt. %, said silica is present in an amount of 62 wt. %, and said calcium oxide is present in an amount of 5 wt. %, based on the total weight of said ceramic material.

4. The insulator of claim 1, wherein said ceramic material has a relative permittivity of 5.5 to 6.5.

5. The insulator of claim 1, wherein said ceramic material includes crystalline silica in an amount of 0 wt. % to 2 wt. %, based on the total weight of said ceramic material.

6. The insulator of claim 1, wherein said ceramic material includes alkalis in an amount of 0 wt. % to 2 wt. %, based on the total weight of said ceramic material.

7. The insulator of claim 6, wherein said alkalis include at least one of sodium, potassium, sodium oxide, and potassium oxide.

8. The insulator of claim 1, wherein said alumina is present in an amount of 33 wt. %, said silica is present in an amount of 62 wt. %, and said calcium oxide is present in an amount of 5 wt. %, based on the total weight of said ceramic material;
said ceramic material includes a mixture of calcium aluminosilicate glass and mullite crystals;
said ceramic material has a relative permittivity of 5.5 to 6.5;
said ceramic material includes crystalline silica in an amount of 0 wt. % to 2 wt. %, based on the total weight of said ceramic material;
said ceramic material includes alkalis in an amount of 0 wt. % to 2 wt. %, based on the total weight of said ceramic material; and
wherein said insulator is produced by firing a mixture of Kaolin, calcined Kaolin, calcium carbonate, silica, calcium silicate, and/or calcium sulfate.

9. The insulator of claim 1, wherein said insulator extends longitudinally along a center axis from an insulator upper end to an insulator nose end; and
said insulator presents an insulator inner surface surrounding a bore extending longitudinally from said insulator upper end to said insulator nose end for receiving a central electrode.

10. The insulator of claim 9, wherein said alumina is present in an amount of 33 wt. %, said silica is present in an amount of 62 wt. %, and said calcium oxide is present in an amount of 5 wt. %, based on the total weight of said ceramic material;
said ceramic material includes a mixture of calcium aluminosilicate glass and mullite crystals;
said ceramic material has a relative permittivity of 5.5 to 6.5;
said ceramic material includes crystalline silica in an amount of 0 wt. % to 2 wt. %, based on the total weight of said ceramic material;
said ceramic material includes alkalis in an amount of 0 wt. % to 2 wt. %, based on the total weight of said ceramic material;
said insulator presents an insulator outer surface having an insulator outer diameter extending across and perpendicular to said center axis;
said insulator outer surface extends longitudinally from said insulator upper end to said insulator nose end;
said insulator outer diameter decreases along a portion of said insulator adjacent said insulator nose end and moving toward said insulator nose end to present an insulator nose region;
said insulator outer diameter decreases along a portion of said insulator spaced from said insulator nose region and moving toward said insulator nose end to present an insulator lower shoulder;
said insulator outer diameter decreases along a portion of said insulator moving toward said insulator upper end at a location spaced from said insulator lower shoulder to present an insulator upper shoulder;
said insulator inner surface presents an insulator inner diameter extending across and perpendicular to said center axis; and
said insulator inner diameter decreases along a portion of said insulator moving toward said insulator nose end for supporting said central electrode.

11. An ignition device including the insulator of claim 1, and further comprising a central electrode extending from a terminal end to a firing end for igniting a fuel-air mixture; and
said insulator surrounding at least a portion of said central electrode.

12. The ignition device of claim 11, wherein said ignition device is a corona igniter, and said central electrode includes a firing tip at said firing end for emitting a corona discharge.

13. The ignition device of claim 12, wherein said alumina is present in an amount of 33 wt. %, said silica is present in an amount of 62 wt. %, and said calcium oxide is present in an amount of 5 wt. %, based on the total weight of said ceramic material after firing;
said ceramic material includes a mixture of calcium aluminosilicate glass, and mullite crystals;
said ceramic material has a relative permittivity of 5.5 to 6.5;
said ceramic material includes crystalline silica in an amount of 0 wt. % to 2 wt. %, based on the total weight of said ceramic material;
said ceramic material includes alkalis in an amount of 0 wt. % to 2 wt. %, based on the total weight of said ceramic material;
said insulator extends longitudinally along a center axis from an insulator upper end to an insulator nose end;
said insulator presents an insulator inner surface surrounding a bore extending longitudinally from said insulator upper end to said insulator nose end for receiving said central electrode;
said insulator inner surface presents an insulator inner diameter extending across and perpendicular to said center axis and decreasing along a portion of said insulator moving toward said insulator nose end for supporting a portion of said center electrode;
said insulator presents an insulator outer surface having an insulator outer diameter extending across and perpendicular to said center axis;
said insulator outer surface extends longitudinally from said insulator upper end to said insulator nose end;
said insulator outer diameter decreases along a portion of said insulator adjacent said insulator nose end and moving toward said insulator nose end to present an insulator nose region;
said insulator outer diameter decreases along a portion of said insulator spaced from said insulator nose region and moving toward said insulator nose end to present an insulator lower shoulder;
said insulator outer diameter decreases along a portion of said insulator moving toward said insulator upper end at a location spaced from said insulator lower shoulder to present an insulator upper shoulder;

said central electrode is formed of an electrically conductive material;

said central electrode has a length extending along said center axis from a terminal end to a firing end, wherein a majority of said length of said central electrode is surrounded by said insulator;

said firing tip of said central electrode includes a plurality of branches extending radially outwardly from said center axis for providing the corona discharge;

and further comprising:

a terminal disposed in said bore of said insulator and engaging said terminal end of said central electrode;

a seal disposed on said terminal end of said central electrode and around a portion of said terminal and filling a portion of said bore;

a shell formed of metal extending along said center axis from a shell upper end to a shell lower end and surrounding a portion of said insulator;

said shell upper end being disposed between said insulator upper shoulder and said insulator upper end and engaging said insulator; and said shell lower end being disposed adjacent said insulator nose region such that at least a portion of said insulator nose region extends axially outwardly of said shell lower end.

14. The ignition device of claim 11, wherein said ignition device is a spark plug and said central electrode includes a central firing surface at said firing end for emitting a spark.

15. The ignition device of claim 14, wherein said alumina is present in an amount of 33 wt. %, said silica is present in an amount of 62 wt. %, and said calcium oxide is present in an amount of 5 wt. %, based on the total weight of said ceramic material after firing;

said ceramic material includes a mixture of calcium aluminosilicate glass and mullite crystals;

said ceramic material has a relative permittivity of 5.5 to 6.5;

said ceramic material includes crystalline silica in an amount of 0 wt. % to 2 wt. %, based on the total weight of said ceramic material;

said ceramic material includes alkalis in an amount of 0 wt. % to 2 wt. %, based on the total weight of said ceramic material;

said insulator extends longitudinally along a center axis from an insulator upper end to an insulator nose end;

said insulator presents an insulator inner surface surrounding a bore extending longitudinally from said insulator upper end to said insulator nose end for receiving said central electrode;

said insulator inner surface presents an insulator inner diameter extending across and perpendicular to said center axis and decreasing along a portion of said insulator moving toward said insulator nose end for supporting a portion of said central electrode;

said insulator presents an insulator outer surface having an insulator outer diameter extending across and perpendicular to said center axis;

said insulator outer surface extends longitudinally from said insulator upper end to said insulator nose end;

said insulator outer diameter decreases along a portion of said insulator adjacent said insulator nose end and moving toward said insulator nose end to present an insulator nose region;

said insulator outer diameter decreases along a portion of said insulator spaced from said insulator nose region and moving toward said insulator nose end to present an insulator lower shoulder;

said insulator outer diameter decreases along a portion of said insulator moving toward said insulator upper end at a location spaced from said insulator lower shoulder to present an insulator upper shoulder;

said central electrode is formed of an electrically conductive material;

said central electrode has a length extending along said center axis from said terminal end to said firing end, wherein a majority of said length of said central electrode is surrounded by said insulator;

and further comprising:

a terminal disposed in said bore of said insulator and coupled to said terminal end of said central electrode;

a seal filling a portion of said bore of said insulator and coupling said terminal end of said central electrode and said terminal;

a shell formed of metal extending along said center axis from a shell upper end to a shell lower end and surrounding a portion of said insulator;

said shell upper end being disposed between said insulator upper shoulder and said insulator upper end and engaging said insulator;

said shell lower end being disposed adjacent said insulator nose region such that at least a portion of said insulator nose region extends axially outwardly of said shell lower end;

a ground electrode formed of an electrically conductive material and extending from said shell lower end toward said central electrode; and said ground electrode including a ground firing surface facing said central firing surface to provide a spark gap between said firing surfaces.

16. A method of manufacturing an insulator for an ignition device, comprising the steps of:

firing a mixture of Kaolin and at least one of: a) calcium carbonate and silica; b) calcium silicate; and c) calcium sulfate and silica.

17. The method of claim 16, wherein the firing step includes firing a mixture of Kaolin, calcium carbonate, and silica.

18. The method of claim 16, wherein the firing step includes firing a mixture of Kaolin and calcium silicate.

19. The method of claim 16, wherein the firing step includes firing a mixture of Kaolin, calcium sulfate, and silica.

20. The method of claim 16, wherein the firing step includes forming a ceramic material including alumina in an amount of 28 to 38 wt. %, silica in an amount of 57 to 67 wt. %, and calcium oxide in an amount of 3 to 7 wt. %, based on the total weight of the ceramic material after firing.

* * * * *